Aug. 22, 1939.  J. N. KENYON  2,170,640

FATIGUE TESTING MACHINE

Filed Nov. 29, 1937  2 Sheets-Sheet 1

INVENTOR.
JOHN N. KENYON
BY
ATTORNEY.

Aug. 22, 1939.  J. N. KENYON  2,170,640
FATIGUE TESTING MACHINE
Filed Nov. 29, 1937  2 Sheets—Sheet 2
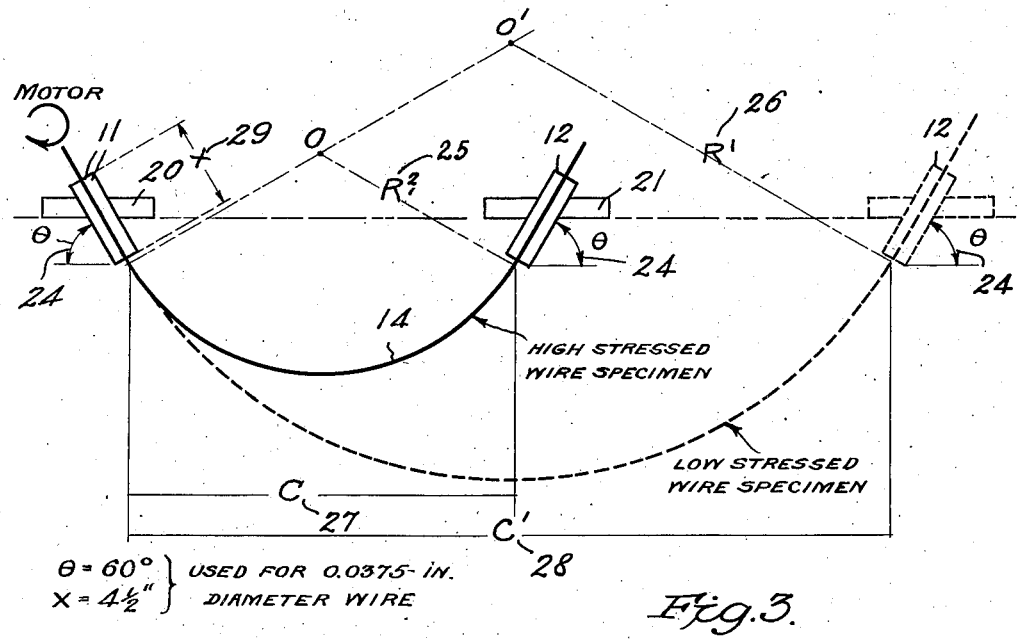
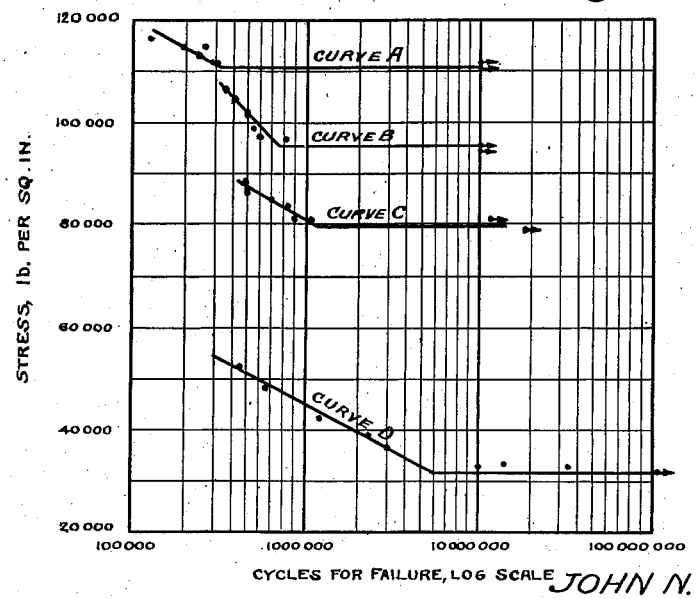
INVENTOR.
JOHN N. KENYON
BY
ATTORNEY.

Patented Aug. 22, 1939

2,170,640

UNITED STATES PATENT OFFICE 2,170,640

FATIGUE TESTING MACHINE

John N. Kenyon, New York, N. Y.

Application November 29, 1937, Serial No. 176,973

2 Claims. (Cl. 73—51)

The present invention relates to fatigue-testing machines and, more particularly, to a rotating-wire arc fatigue machine for testing wire having a small diameter.

It is well known that much valuable information may be secured from physical tests determining various properties of wires, such as the tensile strength. It has recently been shown that there is apparently no relation between the fatigue limit or endurance properties of a wire and its other physical properties with the possible exception of the reverse bend test. In view of these facts and in view of the direct relation of fabricated wire products to the problem of public safety, it is essential that accurate test methods be devised for determining the endurance properties of such materials.

For a proper evaluation of the endurance properties of wire products, there must be a similarity between conditions existing during the testing of the product and the conditions under which the commercial product is to be employed. Wire in service is subjected to cycles of repeated stress. Common causes of such cycles include pulsating tensile loads on the wire, cyclic flexural loads caused by the passage of wires over sheaves or moving from the sheave to the tangent under temperature changes or other influences, and repeated flexure due to lateral swaying of cables. Generally the wire products under such conditions are subjected to a steady tensile load in addition to repeated or reversed bending.

Furthermore, intensive investigations have shown that the fatigue limit of metals is to a large extent affected by the condition of the surface. Imperfections, scratches and surface decarburation frequently may reduce the fatigue limit of wire more than fifty percent. Wire having a small diameter and consequently a small cross section is especially susceptible to the effects of surface conditions. Conventional metallurgical practice does not permit easy control of this problem. Consequently the importance of having an accurate knowledge of the fatigue limit of wire products is of increasing importance due to the wide commercial application of small diameter wire in the manufacture of cable and other products subjected to pulsating stresses. A corollary of the aforesaid problem is the testing of small diameter wire having metallic coatings, such as electroplated wire, dipped wire, sprayed wire, etc. The fact that the endurance properties of a material depend so largely upon the surface conditions requires that the effect of metallic coatings upon the fatigue limits be determined.

As those skilled in the art know, the most obvious method of making fatigue tests on small-diameter wire is by pulsating tension load application. However, accurate calibration and the problem of gripping of the specimens have presented serious difficulties in the commercial application of this method. Furthermore, many machines designed for this type of testing, for example, the Haigh alternating stress machines, are not adaptable to the application of a load under 500 pounds.

Lindeberg of Germany has devised a tension-fatigue machine wherein pulsations are obtained by impressing an alternating current on a D. C. motor. The method is used to test wire having a diameter of about 0.04 inch to about 0.054 inch. Shelton has designed a machine based on the stress-reversal method. The Shelton machine is of the rotating beam type of construction and is suitable for testing wire of constant cross section provided the length of the specimen gives weight sufficient to secure breaks at or near the center of the specimen. Resonant vibrations are eliminated by controlling the speed. Another method devised by deForest and Hopkins depends upon the rotation of the specimen under tension while bent to a circular arc around a sheave. A method for testing wire and small rope in 50 foot specimens has been proposed by Templin whereby the specimens are subjected to a combined tension and bending stress. The machine developed by Haigh and Robertson at the Brunton Laboratories operates with a small-diameter rotating wire bent to strut form by end thrust. Friedman in Germany developed a machine for subjecting wire to alternate bending. Specimens having diameters varying from about 0.60 to about 0.14 inch were employed.

Machines for testing the fatigue limit of small-diameter wire have a fatal defect in that the chucks holding the wire are the source of high localized stresses. Due to these high localized stresses there is a tendency, except when extreme care has been exercised, for the specimen to break near the chuck rather than at the center. This results in a serious error in the value of the endurance limit. A further defect of many machines designed for testing small-diameter wire is the change of surface condition resulting from the necessary operations involved in the preparation of the specimens for testing.

Thus, although many attempts have been made to develop a satisfactory method for testing the endurance limits of small-diameter wire, none, as far as I am aware, has provided a complete and wholly satisfactory means for fatigue testing small-diameter wire.

I have discovered that the above mentioned defects and others in the conventional methods of fatigue testing small-diameter metal objects, including wires and the like may be overcome.

It is an object of the present invention to provide an apparatus for fatigue testing small diameter metallic objects by means of a rotating arc under substantially constant load.

The present invention also contemplates the provision of an apparatus for fatigue testing small-diameter metallic wires wherein breaks do not occur at the chucks.

Other objects and advantages will become apparent to those skilled in the art from the following description taken in conjunction with the drawings, in which:

Fig. 2 is a diagrammatic representation of the measurements taken in conjunction with the calculations of stress, and Fig. 3 is a reproduction of the curves secured in testing specimens in accordance with the principles of the present invention.

Figure 1:
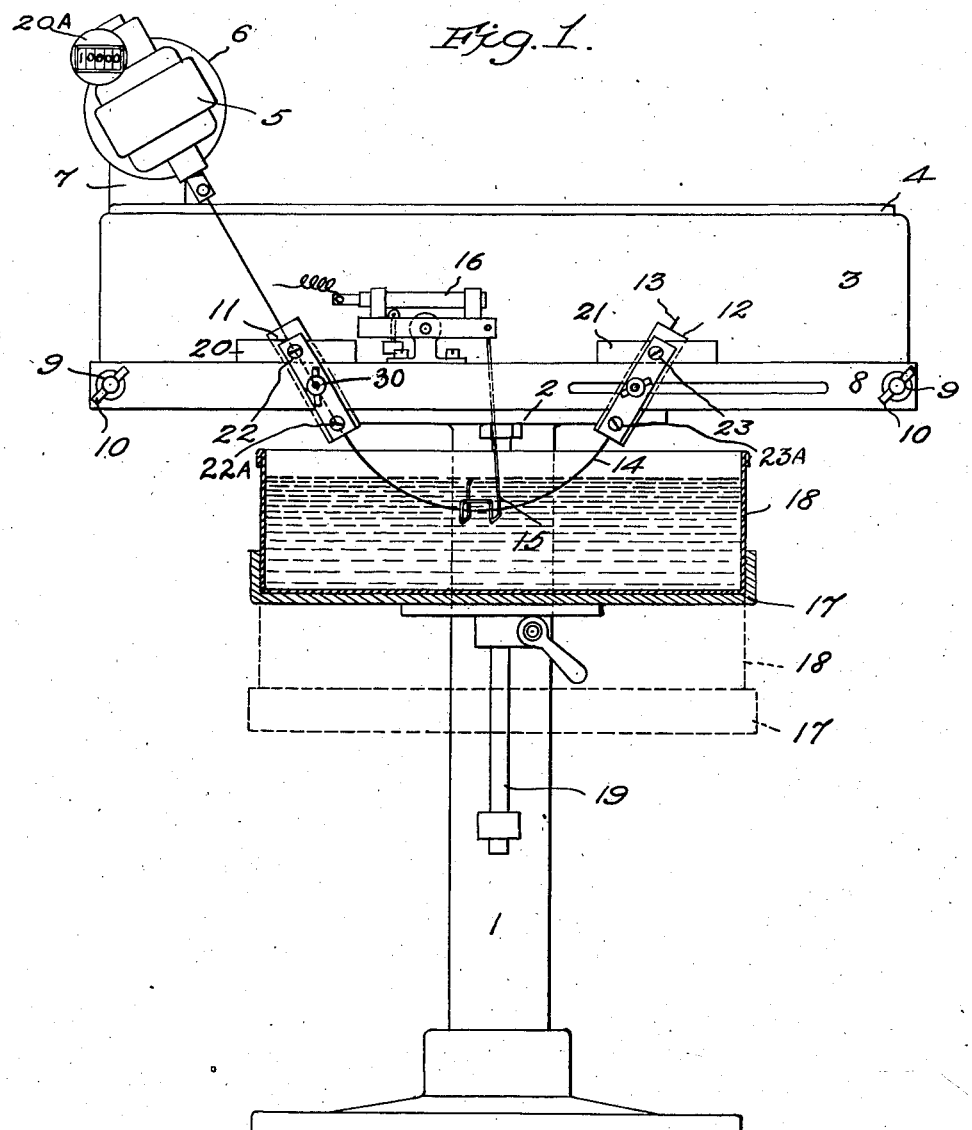
Fig. 1 is a front elevational view of an apparatus embodying the principles of the present invention.

A preferred embodiment of a fatigue testing machine embodying the principles of the present invention is illustrated in Fig. 1 and has a simple construction, an ease of operation and accuracy of determination. The preferred embodiment comprises a frame consisting of a vertical member 1 and three horizontal members 2, 3 and 4. An electric motor 5 mounted on an adjustable base 6 is supported by a vertical member 7 rigidly attached to horizontal member 4. The horizontal member 8 is adjustably attached by means of bolts 9 and wing nuts 10 to horizontal member 3. Adjustably mounted on member 8 are bearings 11 and 12, and there is sufficient space between members 3 and 8 for the accommodation of said bearings. The test specimen, such as a wire 14, having a free end 13 is held by a suitable rotatable holding means, as shown in the drawings in the inclined bearings or specimen holders 11 and 12 one of which is fixed in axial alignment with motor 5 and the other adjusted in a horizontal direction along member 8 to any desired position and fixed in that position for the duration of the test period.

During the testing of the specimen, the inclined open-ended Babbitt bearings 11 and 12 hold the specimen in curved form and in a vertical plane. When the specimen fails the tendency of the material under test is to assume a position in which the stresses are a minimum and consequently tends to straighten out into a straight line. This passage from the position of a portion of an arc to that of a straight line moves member 15. The movement of member 15 in turn actuates switch 16 which stops the motor 5. Preferably switch 16 is in the form of the conventional mercury switch. Horizontal member 17 supports a tank 18 of suitable dimensions to provide a bath of liquid in which the test specimen may be immersed during the test period. The use of the bath of liquid, preferably of oil, dampens the lateral vibrations. Horizontal member 17 is adjustably mounted on vertical member 19 to provide means for lowering and raising the bath. Vertical element 19 in turn depends from horizontal member 2 which is secured to vertical member 1 and supports elements 3 and 4. A counter 20A, preferably a Veeder counter, is attached to the motor for registering the number of cycles of reverse bending to which the specimen is subjected.

Fig. 2 depicts in a diagrammatic manner the measurements which are required to make the necessary calculations for stress determinations. Bearing 11 is a fixed bearing and 12 is a horizontally movable bearing. Both bearings maintain a fixed angle 24 with the horizontal. The radius of curvature for highly stressed specimens is 25 and for lowly stressed specimens is 26. The cord of the shorter arc for the highly stressed specimens is 27 and for specimens tested under a comparatively low stress the chord of the arc is 28. The lengths of the bearings is the distance 29 and I have found that a length of about 4.5 inches is suitable when testing wire having a diameter of about 0.0375 inch. I have found it desirable to have the fixed angle 24 of the bearings 11 and 12 about 60° when testing such specimens.

In order that those skilled in the art may have a better understanding of the apparatus for fatigue testing small-diameter metallic objects, that is, wires having, for example, diameters from about 0.005 inch to about 0.19 inch, and the method therefor, a description of a preferred embodiment will be given in conjunction with Figs. 1 and 2.

The novel machine comprises means for holding the test specimen in curved form and in a vertical plane with one end fixed and the other free. For this purpose, two inclined open-ended Babbitt metal bearings 11 and 12 are provided. The angle at which the bearings are inclined to the horizontal is dependent to a certain extent upon the character of the material tested. Bearings 11 and 12 are secured to slides 20 and 21 by means of machine screws 22, 22A, 23 and 23A or similar devices. The bearings are fixed in position by means of wing nuts 30. The bearings of the drawings illustrate one embodiment of the present invention and comprise an open-ended tubular bearing member through which the specimen extends, having a plurality of threaded depressions, preferably two, and a threaded projection on one side and a flat member provided with cooperative holes. The bearing 11 contiguous to the motor 5 is assembled on member 8 with the bearing member of the bearing in the space provided for its accommodation between members 3 and 8 and with the threaded projection on said bearing member inserted in a suitable hole in member 8 to place the bearing in axial alignment with motor 5. A flat strip is placed on the opposite side of member 8 with the holes nearest the ends in alignment with the threaded depressions of the tubular member and the intermediate hole in alignment with the threaded projection. Slide 20 is mounted as described supra on member 8 and lies between the bearing member and the flat strip of bearing 11. The slide also has a hole through it to cooperate with the uppermost holes in said bearing member and said flat strip. Machine screws 22 and 22A are passed through the two holes nearest the ends of the flat strip, screw 22 being inserted in the cooperative holes of the slide 20 and of the bearing member, and screw 22A being inserted in the cooperative hole of the bearing member, and both are then drawn up to give the assembly a sliding fit on member 8. Wing nut 30 is then mounted on the threaded projection and with the tubular member in axial alignment with the shaft of motor 5, the wing nut is tightened down until the bearing and slide are securely fixed in that position. The other bearing 12 is assembled in a similar manner, but its threaded projection is inserted in a suitable horizontal slot in member 8 instead of through a hole, and bearing 12 is therefore capable of being fixed at any desired position on member 8. In this manner movement of the bearing about the threaded projection permits variation of the angle theta. The base 6 is so mounted on member 7 as to be adjustable in position in order to vary the inclination of the motor and holding means to bring the same into axial alignment with bearing 11, as those skilled in the art will understand. Slides 20 and 21 are mounted on member 8, resting thereon and being free to move therealong in response to changes in inclination of said bearings. As bearing 12 is adjustable in a horizontal direction along member 8 as aforesaid, slide 21, being secured to said bearing 12, may move freely along member 8 while the other slide is fixed. Although this is the preferred embodiment, it is an obvious modification to have both bearings, together with the motor and holding means, horizontally displaceable on member 8, along which either may be free to move while the other is fixed. The movable slide may be secured temporarily for the duration of the test at any desired position along member 8. The lowest portions of the arc formed by the test specimen dip in an oil bath. One end of the test specimen is attached by a rotatable holding means to a small electric motor or similar device for rotating the specimen and the other end is free to adjust itself longitudinally in the inclined bearing. A counter is attached to the motor and registers the number of cycles of reverse bending to which the specimen is subjected. As the specimen rotates, it automatically eliminates flexural shear at the free end and assumes the form of a circular arc whereby the specimen is subjected to reverse bending with substantially constant strain under uniform bending moment for its entire length and practically without effective localized stress at the edges of the bearings. It is to be observed that failure occurs not only at the mid-point of the arc but likewise throughout the length of the specimen with the exception of those points immediately contiguous to the bearings. Thus a disadvantage inherent in machines using a wire bent to a strut form is avoided. As is well known, the break in the latter type of machine almost invariably occurs at the center of the flexed portion of the specimen when it does not occur at the chucks. Both bearings are inclined at a definite fixed angle, and different radii of curvature are obtained by horizontal adjustment of one inclined bearing. Straight test specimens are preferred. Stress computations are based on direct measurement of the horizontal chord 27 or 28, wherein the ends of the horizontal slides 20 and 21 are used as convenient reference points. When the specimen under test fails the movement toward a position of rest actuates element 15 which trips a switch 16 which immediately stops the motor. Of course, when other sources of rotary motion are employed other means of interrupting the rotation of the specimen on its own axis may be provided. Such cut outs are within the skill of those skilled in the art.

Stress determinations are based on the arc formula: Extreme fiber stress, $$\text{Lb./sq. in.} = \frac{EL}{RZ} = \frac{Ed}{2R} = \frac{Ed}{C} \sin\theta$$

where
E = modulus of elasticity,
Z = section modulus,
d = diameter of wire specimen,
R = radius of curvature,
Theta = angle of inclined bearing with the horizontal,
C = horizontal chord = 2R sin theta, and
I = moment of inertia.

A relatively low viscosity oil, such as transformer oil has been found satisfactory for the oil bath, although heavier and lighter oils or even water may be used. The specimen rotates in the oil with scarcely visible movement and is not noticeably affected by speed variation. An energy input determination showed that the drag effect of the oil on an 0.038-inch diameter wire amounts to a torque of about 0.0045 inch-pound and corresponds to a shear stress of about 435 pounds per square inch. The torque due to friction in the bearings is too small for accurate determination. The specimens may be tested under low and high stresses as is indicated in Fig. 2.

The tendency of the wire to sag due to its own weight is found to be negligible, since a double exposure on a sheet of blueprint paper with the wire arc in an upward and downward position respectively showed no measurable change in curvature. Breaks may occur at any point along the arc but they seldom occur at the ends of the bearings. The wire acts as its own shaft and does not undergo appreciable wear in the bearings. As an example of this fact, a copper-beryllium wire specimen was only slightly worn after $10^7$ reversals.

The advantages of the present apparatus are the following: nominal cost, ease and simplicity of operation, no gripping problem or bearing failures, vibrations dampened in an oil bath, a free end with all alignments, fatigue breaks are not confined to one point and self calibration due to the specimen assuming the arc form.

In Fig. 3 curves are illustrated for the testing of wire having a diameter of 0.0375 inch with the usual commercial surface condition. Curve A is for piano wire, curves B and C for cold-drawn steel wire, and curve D for untreated copper-beryllium wire. The following table gives the tensile strength, the fatigue limit and the ratio of fatigue limit to tensile strength for the various wires used in producing the curves in Fig. 3.

| Material | Tensile strength, lb. per sq. in. | Fatigue limit, lb. per sq. in. | Ratio fatigue limit to tensile strength |
|---|---|---|---|
| Curve A—piano wire (C 0.85 to 0.88, Mn 0.30 to 0.35) | 374,000 | 111,000 | 29.7 |
| Curve B—cold-drawn steel wire (C 0.66, Mn 0.80) | 282,000 | 95,000 | 34.0 |
| Curve C—cold-drawn steel wire (C 0.60 to 0.65, Mn 0.75 to 0.80) | 275,000 | 79,500 | 29.0 |
| Curve D—copper (2.25 Be.) wire | 132,500 | 31,500 | 24.0 |

The effect of prior treatment and surface condition upon the fatigue limit was demonstrated clearly by a series of tests carried out with piano wire and a high carbon steel wire. Piano wire as drawn failed under a stress of 111,000 pounds per square inch after $10^7$ reversals. After being polished the same wire failed under a stress of 120,000 pounds per square inch after $10^7$ reversals. After being stored for six months in a closet the wire failed after $10^7$ reversals under a stress of about 104,000 pounds per square inch.

A sample of high carbon steel wire as drawn was subjected to a stress of about 95,000 pounds per square inch and failed after $10^7$ reversals. After storage under conditions which apparently precluded subjecting the wire to adverse influences other than the accumulation of dust, the same high carbon wire failed under a stress of about 62,000 to about 85,000 pounds per square inch after $10^7$ reversals. Instead of a single curve a family of curves was obtained. Inspection of the wire under the microscope disclosed that, while the wire appeared as bright as when first stored, still the surface was broken by a multiplicity of pits which, it has been suggested, were eroded areas resulting from corrosion caused by specks of dust.

It is clear that the present apparatus will not be confused with the conventional apparatus and methods in common use for the purpose of fatigue-testing, but it should be pointed out, for example, that the Shelton machine is essentially for use in a constant stress test method whereas a machine embodying the principles of the present invention applies the principles of the constant strain method.

Although the present invention has been described in conjunction with certain embodiments thereof, it is to be understood that variations and modifications may be made as those skilled in the art will readily understand. Such variations and modifications are to be understood to be within the purview of the specification and within the scope of the appended claims.

I claim:

1. An apparatus for subjecting a test wire of small diameter to fatigue testing in a substantially circular arc without contact of its arcuate portion with a solid surface to determine the weakest point in the test wire and to determine the truly representative fatigue value of the test wire by failure at said weakest point which comprises a frame, two open-ended bearings mounted on said frame, said bearings having their axes in substan ally the same plane but not in alignment with each other and being adapted for freely engaging a test wire undergoing fatigue testing to cause the same to assume a substantially circular arc, and means for rotating a test wire and holding one end thereof substantially in axial alignment with one of said bearings, whereby said test wire has its other end free to move longitudinally as well as rotationally, and whereby said test wire automatically assumes during rotation a substantially circular arc between said bearings without contact of said arc with a solid surface, thereby uniformly stressing said test wire along said circular arc and producing failure at the weakest point therein to give a truly representative fatigue value.

2. An apparatus for subjecting a test wire of small diameter to fatigue testing in a substantially circular arc without contact of the arcuate portion with a solid surface to determine the weakest point in the test wire and to determine the truly representative fatigue value of the test wire by failure at said weakest point which comprises a frame, a rotatable holding means mounted thereon and adapted to hold one end of a test wire in its axis of rotation, a motor to rotate said holding means and test wire, two tubular bearings mounted on said frame, said bearings having their axes in substantially the same plane but not in alignment with each other and being adapted for loosely engaging solely at its sides a test wire undergoing fatigue testing, one of said bearings being substantially in axial alignment with said holding means, the other bearing being horizontally displaceable on said frame, and both bearings and holding means having their inclination to the horizontal adjustable, a receptacle for liquids in such space relationship to the said two bearings that the arcuate portion of said test wire dips therein, and a counter for indicating the total cycles of rotation, whereby said test wire is held by the holding means at one end and has its other end free to move longitudinally as well as rotationally, and whereby said test wire automatically assumes during rotation a substantially circular arc between said bearings without contact of said arc with a solid surface, thereby uniformly stressing said test wire along said circular arc and producing failure at the weakest point therein to give a truly representative fatigue value.

JOHN N. KENYON.